July 17, 1962     A. W. BARBER     3,045,169

REGULATED POWER SUPPLIES

Filed Nov. 29, 1957

INVENTOR.

ALFRED W. BARBER

United States Patent Office 3,045,169
Patented July 17, 1962

3,045,169
REGULATED POWER SUPPLIES
Alfred W. Barber, South Easton, Mass.
(32—44 Francis Lewis Blvd., Flushing 58, N.Y.)
Filed Nov. 29, 1957, Ser. No. 699,843
1 Claim. (Cl. 321—18)

The present invention concerns power supplies and in particular, transistor regulated power supplies.

Transistor circuits require low voltage power supplies. In cases where appreciable power is to be supplied, these power supplies are required to furnish rather high current. In a conventional power supply for tube circuits operating at relatively high voltage and low current, capacitors and inductors are used for filtering rectified alternating current to provide hum-free direct current. In order to provide the high currents required for transistor circuits, conventional filtering would require very large capacitors and low resistance inductors. These are expensive and cumbersome. It has been found according to the present invention that a satisfactory direct current supply can be provided with little or no filtering in the conventional manner. This result is accomplished by utilizing a two phase alternating current source provided by phase splitting and a transistor regulator. The two phase source when used with full wave rectifiers yields pulsating direct current which has a minimum value of 0.7 of the peak value and may be smoothed with a transistor regulator without the use of capacitors.

Thus the main object of the present invention is to provide steady direct current from alternating current without using capacitors or inductors.

Another object is to provide substantial current with a minimum of ripple.

Still another object is to provide an effective transistor regulator from a two phase source without the use of filter capacitors.

These and other objects will be apparent from the detailed description of the invention given in connection with the various figures of the drawing.

Figure 1:
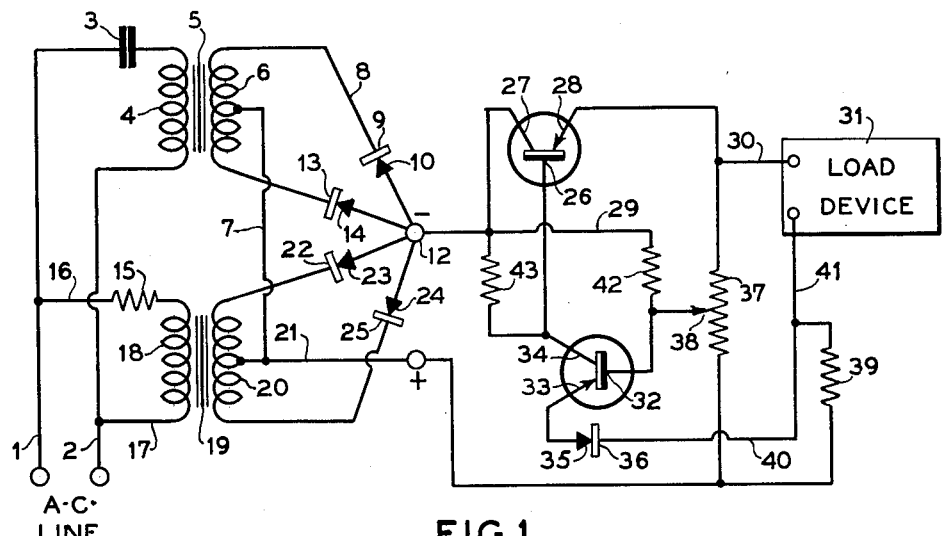
FIG. 1 shows a schematic diagram of the preferred form of the present invention.

In FIG. 1 alternating current from the line is supplied over leads 1 and 2 to transformers 4—5—6 and 18—19—20. One side of primary 4 and one side of primary 18 over lead 17 are connected to one side of the line at lead 2. From the other side of the line 1, alternating current is fed to the other side of primary 18 over lead 16 and through resistor 15 and also from lead 1 through capacitor 3 to the other side of primary 4. Now, if the reactance of capacitor 3 is substantially equal to the reactance of primary 4 the current through primary 4 will lead the current in primary 18 by substantially 90 degrees. Resistance 15 is chosen to have a value of resistance equal to the reactance of primary 4 or primary 18 so that the currents in the two primaries will be substantially equal in magnitude but 90 degrees out of phase. Secondaries 6 and 20 are center tapped and these center taps are connected to the positive side of the direct current circuit over leads 7 and 21. One side of secondary 6 is connected over lead 8 to cathode 9 of rectifier 9—10 the anode 10 being connected to 12 the negative side of the direct current circuit. The other side of secondary 6 is connected to cathode 13 and anode 14 is connected to 12. Similarly one side of secondary 20 is connected to cathode 22 and anode 23 is connected to 12, and the other side of secondary 20 is connected to cathode 25 and anode 24 is connected to 12. Now between point 12 and the plus side of the system will be generated a pulsating direct current which has a maximum relative value of 1.0 and a minimum of 0.7.

Figure 2:
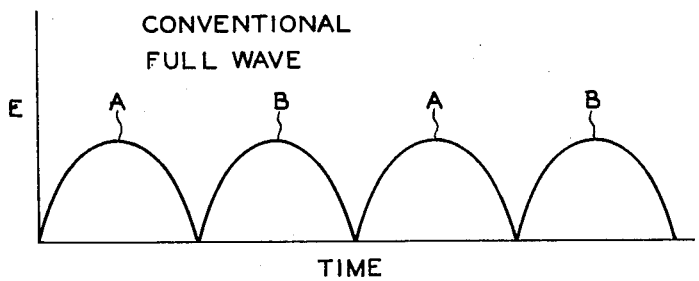
FIG. 2 shows a diagram of wave forms useful in explaining the operation of a conventional rectifier.

FIG. 2 shows wave forms generated by a conventional full wave rectifier in which A is from one half of the input wave and B is from the other. It will be seen that the instantaneous value of the combined waves A and B varies from some maximum value of say 1.0 to zero.

Figure 3:
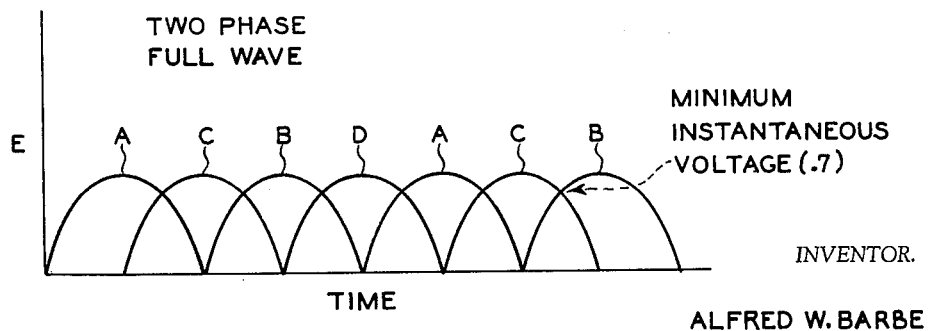
FIG. 3 shows a diagram of wave forms useful in explaining the operation of the present invention.

FIG. 3 shows waves representing the voltage from point 12 to the plus side of the system where A and B represent the rectified currents or voltages from transformer 4—5—6 and C and D represent the rectified currents from the transformer 18—19—20. It will be seen that the combined waves A—B—C—D results in a wave having a maximum value of 1.0 and a minimum value of 0.7. While the picture will be modified under load by regulating effects, the voltage from 12 to the plus side of the system will be substantially the envelope of A—B—C—D having this peak value of 1.0 and a minimum value of 0.7. If a regulator is added to the system which produces a constant output for all input voltages above 0.7 the system will provide a constant direct current output. The transistor regulator of FIG. 1 will do this.

Again in FIG. 1 the transistor regulator includes series control transistor 26—27—28 and amplifier transistor 32—33—34. The negative side of the direct current system point 12 is connected over lead 29 to collector 27 and emitter 28 is connected over lead 30 to load device 31. Thus plus side of the direct current system is connected through resistor 39 and over lead 41 to the positive side of load device 31. Emitter 33 is connected to a voltage reference device such as Zena diode 35—36 which is returned to the load side of resistor 39 so that changes in load current are compensated in the regulating circuit. Base 32 is connected to a point on resistor 37 which sets the total voltage regulated as a multiple of the reference voltage and this point may be adjustable as indicated by slider 38. Collector 34 is connected to base 26 and is supplied with current through resistor 43 which also acts as a load resistor and helps determine the gain and hence the sensitivity of the regulating system. Resistor 42 is connected from the unregulated side of transistor 26—27—28 to base 32 and serves to improve regulation of the system with respect to input voltage variations and also improves hum suppression. As long as the regulated output to load device 31 called for by the adjustments of the regulating circuit just described does the envelope of the rectifier outputs as shown in FIG. 3, a substantially constant, hum free direct current output is obtained without the use of capacitors or inductors as filtering elements in the direct current circuit. Since the load on the direct current circuit is reflected back eventually to the primaries of the transformers, capacitor 3 should be chosen to give 90 degrees phase shift at substantially the maximum direct current load point. This will permit obtaining maximum constant direct current output from the system.

While a single embodiment of the present invention has been shown and described, many modifications will be apparent to those skilled in the art within the scope and spirit of the invention as set forth in particular in the appended claim.

What is claimed is:

In a power supply for converting single phase alternating current to substantially unvarying regulated direct current without employment of substantial direct current storage capacitors, the combination of, two alternating current transformers each including at least a primary and a center-tapped secondary, a pair of terminals for connection to source of single phase alternating current, a reactor connected between one of said terminals and one side of one of said primaries, a resistor connected between one of said terminals and one side of the other of said primaries to supply substantially equal amplitude and 90 degree phase shifted alternating currents to said primaries, a pair of rectified current terminals, connections between said center-taps and one of said rectified current terminals, rectifiers connected between said secondaries and the other of said rectified current terminals to provide full wave rectified current to last said rectified current terminal, a non-reactive smoothing circuit connected between said rectified current terminals and a pair of load terminals including a transistor series connected between one of said rectified current terminals and one of said load terminals, a Zener diode connected to the other of said load terminals, and coupling means connected between said Zener diode and said transistor wherein the voltage across said load terminals is maintained substantially constant and ripple-free by the non-reactive circuit.

References Cited in the file of this patent

UNITED STATES PATENTS

| | | |
|---|---|---|
| 1,708,908 | Spencer | Apr. 9, 1929 |
| 1,723,583 | Shoemaker | Aug. 6, 1929 |
| 1,867,503 | Fitz et al. | July 12, 1932 |
| 1,888,360 | Van B. Roberts | Nov. 22, 1932 |
| 2,209,948 | Harmer | Aug. 6, 1940 |
| 2,698,416 | Sherr | Dec. 28, 1954 |
| 2,751,549 | Chase | June 19, 1956 |
| 2,762,008 | Gordon | Sept. 4, 1956 |
| 2,897,432 | Jackson | July 28, 1959 |